(12) United States Patent
Natarajan et al.

(10) Patent No.: US 10,797,760 B2
(45) Date of Patent: Oct. 6, 2020

(54) SHARED-ANTENNA INTERFACE APPARATUS FOR SIMULTANEOUS TRANSMIT AND RECEIVE

(71) Applicant: Oregon State University, Corvallis, OR (US)

(72) Inventors: Arun Natarajan, Corvallis, OR (US); Abhishek Agrawal, Corvallis, OR (US); Sanket Jain, Corvallis, OR (US); Robin Garg, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 0 days.

(21) Appl. No.: 15/956,660

(22) Filed: Apr. 18, 2018

(65) Prior Publication Data

US 2019/0319681 A1 Oct. 17, 2019

Related U.S. Application Data

(60) Provisional application No. 62/487,983, filed on Apr. 20, 2017.

(51) Int. Cl.
*H04B 7/0413* (2017.01)
*H04L 5/14* (2006.01)
*H04B 7/26* (2006.01)
*H04B 1/40* (2015.01)

(52) U.S. Cl.
CPC .............. *H04B 7/0413* (2013.01); *H04B 1/40* (2013.01); *H04B 7/2621* (2013.01); *H04L 5/1461* (2013.01)

(58) Field of Classification Search
CPC ...... H04B 7/0413; H04B 7/2621; H04B 1/40; H04L 5/1461
See application file for complete search history.

(56) References Cited

U.S. PATENT DOCUMENTS

| | | | |
|---|---|---|---|
| 6,807,222 B1 | 10/2004 | Widdowson | |
| 6,980,527 B1 | 12/2005 | Liu et al. | |
| 8,699,975 B1 * | 4/2014 | Schleicher | ........... H03G 3/3042 333/109 |
| 2005/0254558 A1 | 11/2005 | Dutka | |
| 2011/0053525 A1 * | 3/2011 | Yi | ........................ G06K 7/0008 455/83 |

(Continued)

OTHER PUBLICATIONS

Reiskarimian, Negar et al. "A CMOS Passive LPTV Nonmagnetic Circulator and Its Application in a Full-Duplex Receiver" IEEE Journal of Solid-State Circuits, vol. 52, No. 5, May 2017, pp. 1358-1372 (15 pages).

(Continued)

*Primary Examiner* — Jackie Zuniga Abad
(74) *Attorney, Agent, or Firm* — Green, Howard & Mughal, LLP

(57) ABSTRACT

An apparatus for simultaneous transmit and receive is provided. The apparatus is capable of rejecting or passing transmitter and receiver signals. The apparatus includes: a transmitter; an antenna (e.g., a shared antenna); a receiver including switches controllable by time varying signals; and a quadrature coupler including first, second, third, and fourth ports, wherein the first port is coupled to the transmitter, wherein the second port is coupled to the antenna, and wherein the third and fourth ports are coupled to the receiver.

21 Claims, 8 Drawing Sheets

(56) References Cited

U.S. PATENT DOCUMENTS

2014/0080436 A1  3/2014  Madadi et al.
2019/0207288 A1* 7/2019  Zhu .......................... H01P 5/18

OTHER PUBLICATIONS

Van Liempd, Barend, et al. "A +70-dBm IIP3 Electrical-Balance Duplexer for Highly Integrated Tunable Front-Ends" IEEE Transactions on Microwave Theory and Techniques, vol. 64, No. 12, Dec. 2016, pp. 4272-4286 (13 pages).
Abhishek et al., "A 0.3 GHz to 1.4 GHz N-path Mixer-based Code-Domain RX with TX Self-Interference Rejection", Radio Frequency Integrated Circuits Symposium (RFIC), 2017 IEEE; Jun. 4-6, 2017; DOI: 10.1109/RFIC.2017.7969070. (4 pages).
Abhishek et al., "A Concurrent Dual-Frequency/Angle-of-Incidence Spatio-spectral Notch Filter using Walsh Function Passive Sequence Mixers", 2017 IEEE/MTT-S International Microwave Symposium-IMS 2017; 10.1109/MWSYM.2017.8058941 (4 pages).
Non-Final Office Action dated May 1, 2019 for U.S. Appl. No. 15/977,448.
Non-Final Office Action dated Nov. 18, 2019 for U.S. Appl. No. 15/977,448.
Notice of Allowance dated May 21, 2020 for U.S. Appl. No. 15/977,448.

* cited by examiner

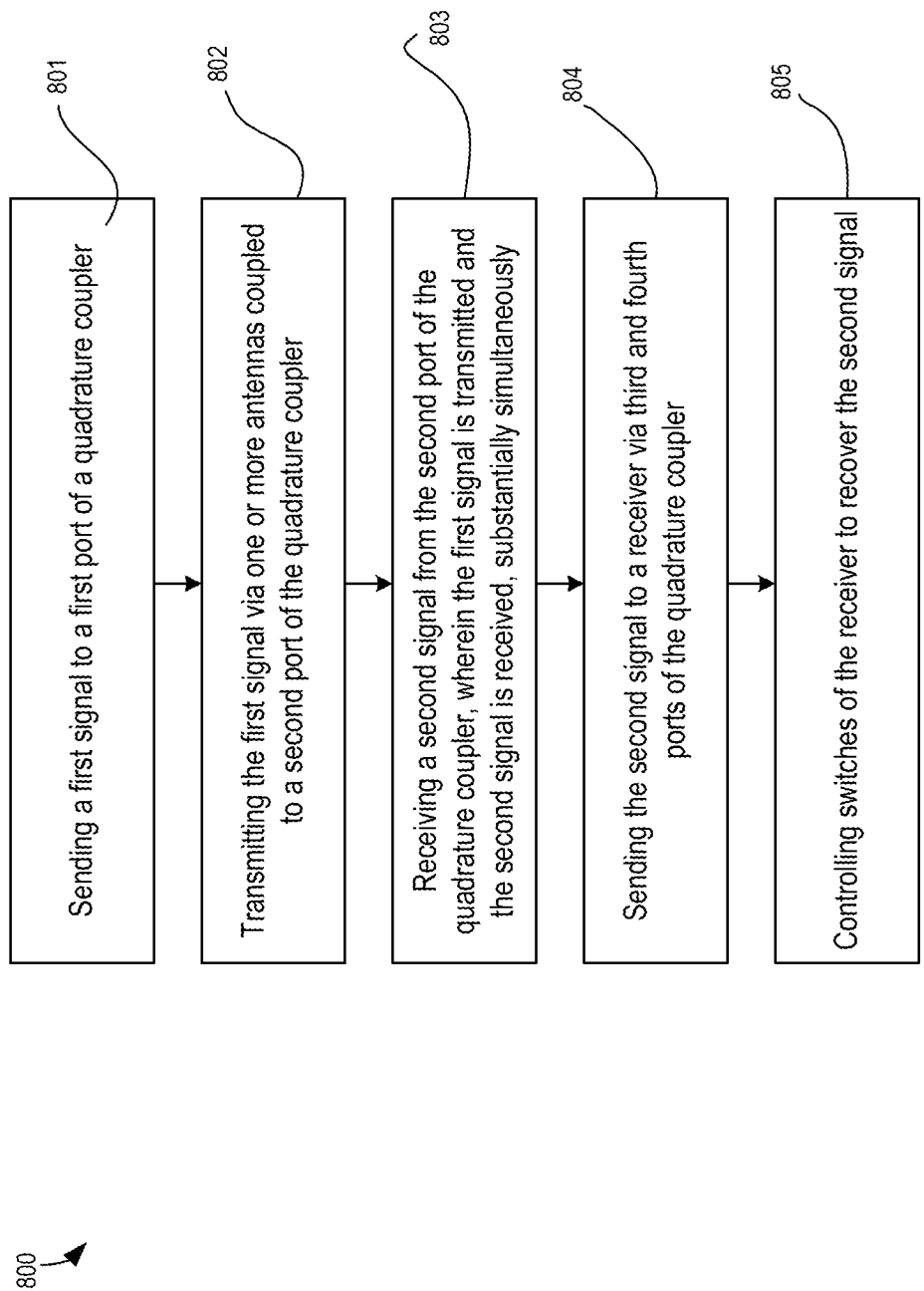

US 10,797,760 B2

SHARED-ANTENNA INTERFACE APPARATUS FOR SIMULTANEOUS TRANSMIT AND RECEIVE

CLAIM FOR PRIORITY

This application claims priority to U.S. Provisional Patent Application No. 62/487,983, filed on 20 Apr. 2017, titled "SHARED-ANTENNA INTERFACE FOR SIMULTANEOUS TRANSMIT AND RECEIVE," and which is incorporated by reference in its entirety.

GOVERNMENT SUPPORT STATEMENT

The embodiments of the invention were made with the support of the United States Government under Award No. 1554720-ECCS awarded by the National Science Foundation. The Government has certain rights in the invention.

BACKGROUND

Wireless spectrum is very crowded. To increase overall network capacity, the wireless spectrum is reused among many users. Also, often it is desirable to have the transmitter and receiver operating at the same time at the same or different frequency (e.g., duplex links). In these cases, the receiver sees strong undesirable signals (e.g., either from the transmitter or from other users) along with weak desired signals. Therefore, there remains a need to provide a way to filter multiple undesirable signals enabling recovery of weak signal in the presence of strong interferer.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 8 illustrates a flowchart of a method for operating the apparatus for simultaneous transmit and receive operations using any one of the apparatuses of FIGS. 3-7, in accordance with some embodiments of the disclosure.

DETAILED DESCRIPTION

Figure 1:
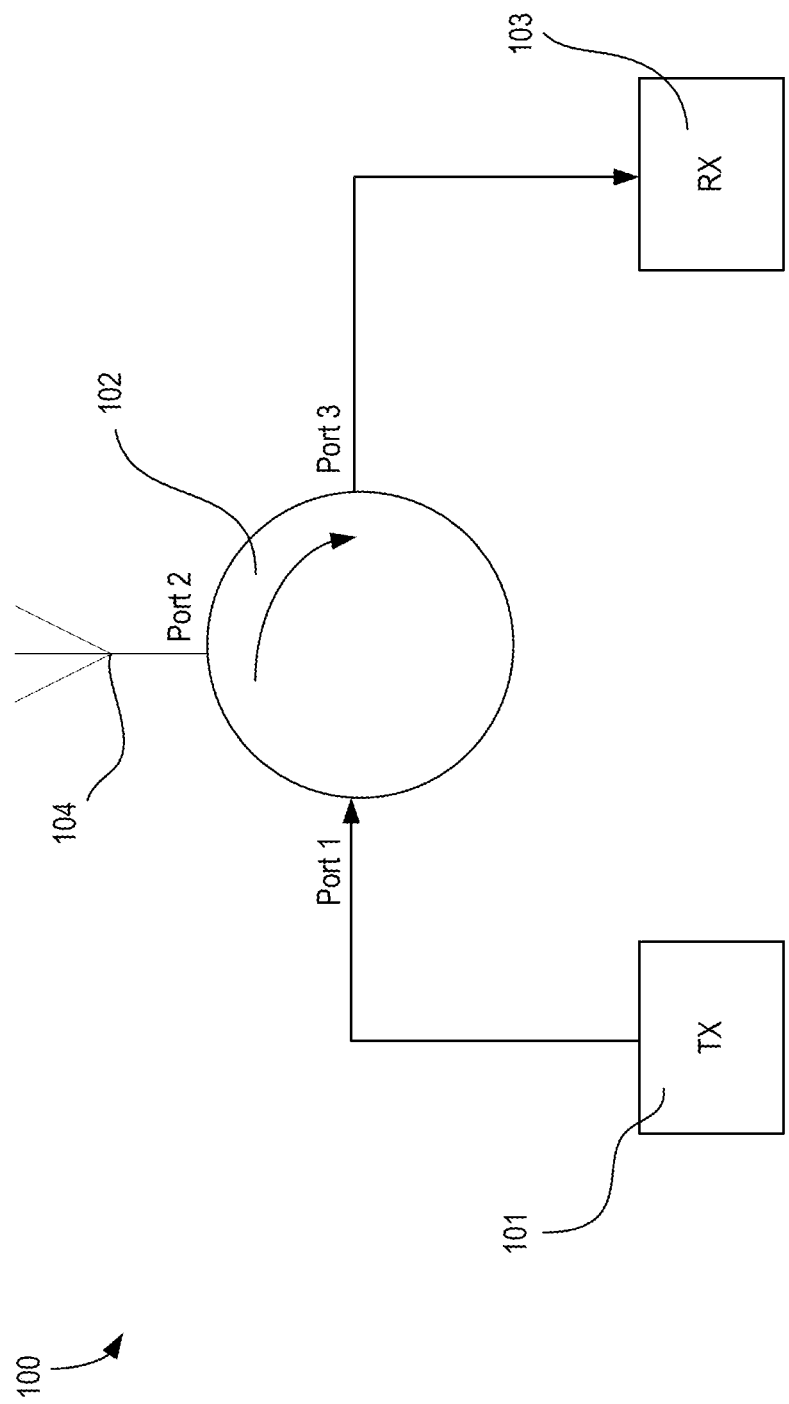
FIG. 1 illustrates a communication apparatus with a circulator for sharing an antenna interface between a transmitter (TX) and a receiver (RX).

Wireless transmit/receive systems in which the transmitter (TX) and receiver (RX) operate simultaneously while sharing an antenna enables: (a) doubling of frequency spectrum efficiency in the wireless networks, (b) a class of radar applications and (c) reduces the size of the system by enabling antenna sharing between the TX and RX. Such wireless radios can be broadly categorized as simultaneous transmit and receive systems (STAR) with antenna sharing. Such a wireless system requires the ability to receive the weak incident signal in the presence of the powerful transmitted signal. This is a critical challenge since the transmit signal can saturate the RX and/or interact with other interferers further corrupting desired signal. The TX signal, in some cases, may be at the RX frequency. Such systems are called Full-Duplex (FD). In Frequency-Domain Duplex (FDD) systems on the other hand, transmit signal frequency is different from RX frequency. However, a shared antenna (e.g., shared between the TX and RX) requires transmit frequency to be in proximity to RX frequency making it challenging to attenuate the transmitted signal using band-pass filters.

Various embodiments describe a communication apparatus with a shared antenna interface for rejecting or passing transmitter and receiver signals. The shared antenna interface of various embodiments is able to work up to RF (radio-frequency) frequencies which are of interest for cellular and WiFi wireless communication.

In some embodiments, the communication apparatus comprises a transmitter (TX); an antenna; a receiver (RX) including switches controllable by time varying signals; and a quadrature coupler including first, second, third, and fourth ports, wherein the first port (e.g., input port) is coupled to the TX, wherein the second port (e.g., isolation port) is coupled to the antenna, and wherein the third port (e.g., through port) and the fourth port (e.g., coupling port) are coupled to the TX. In some embodiments, the communication apparatus comprises a finite state machine (FSM) to generate the time-varying signals for controlling the switches. These time-varying signals can be one of: a periodic signal; or a code-modulated signal.

In some embodiments, the switches of the receiver are organized into first and second banks such that the first bank is coupled to the third port, and the second bank is coupled to the fourth port, and wherein the receiver comprises capacitive devices coupled to the first and second banks. The voltages on the capacitors are combined (in any suitable manner) to generate a received signal which is then sent to a logic for processing. In some embodiments, each port of the quadrature coupler may be coupled to an impedance structure (e.g., a variable impedance structure) to adjust the signal reflection and power transfer characteristics of the apparatus. In some embodiments, the quadrature coupler and the switches of the RX are integrated in different technologies. In some embodiments, the TX and RX are fabricated on a single integrated circuit (IC) chip, and wherein the quadrature coupler and the antenna are off-chip and coupled to the IC chip. In some embodiments, the antenna is part of the multiple-input-multiple-output (MIMO) antenna array. In some embodiments, the antenna is part of the single-input-single-output (SISO) antenna.

There are many technical effects of various embodiments. For example, the apparatus of various embodiments provides a scheme for simultaneous transmit and receive of signals while providing a way to filter multiple undesirable signals. As such, weak signals (e.g., signals with low amplitude) can be recovered in the presence of strong interference (e.g., signals with high amplitude). The apparatus also allows for realizing radios with dynamic frequency spectrum access because the communication can be readily established in an unused frequency spectrum. Other technical effects will be evident from the various figures and embodiments.

The embodiments of the disclosure will be understood more fully from the detailed description given below and from the accompanying drawings of various embodiments of the disclosure, which, however, should not be taken to limit the disclosure to the specific embodiments, but are for explanation and understanding only.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, optical, electromagnetic signal, magnetic signal, or data/clock signal. The meaning of "a," "an," and "the" include plural references. The meaning of "in" includes "in" and on.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described, but are not limited to such.

FIG. 1 illustrates a communication apparatus 100 with a circulator for sharing antenna interface between a TX and RX. Here, apparatus 100 shows a TX 101, circulator 102, RX 103, and antenna 104. TX is coupled to port 1 of circulator 102, antenna 104 is coupled to Port 2 of circulator 102, and RX 103 is coupled to Port 3 of circulator 102. The circulator 102 allows a signal to flow from Port 1 to Port 2 and from Port 2 to Port 3. However, circulator 102 does not allow signal transfer from Port 1 to Port 3. Therefore, circulator 102 results in attenuation of whole or part of the transmitter signal at RX 103, enabling RX 103 to demodulate a weak desired signal while transmitting a strong signal.

Circulator 102 can be implemented, for example, using ferrite materials or a lumped-element transmission line structure. Circulators implemented using ferrite materials result in different phase velocities for waves in different directions. The ferrite material based approach leads to circulators that are not compatible with integration in commercial integrated circuit technologies, however. Circulators using lumped-element transmission line structures with N-path filters constructively add TX signal in two paths at the antenna while they add destructively at the RX resulting in TX signal nulling at the RX. Using circulators for simultaneous TX and RX operations may be challenging as signals constructively and destructively add up in the circulators.

Figure 2:
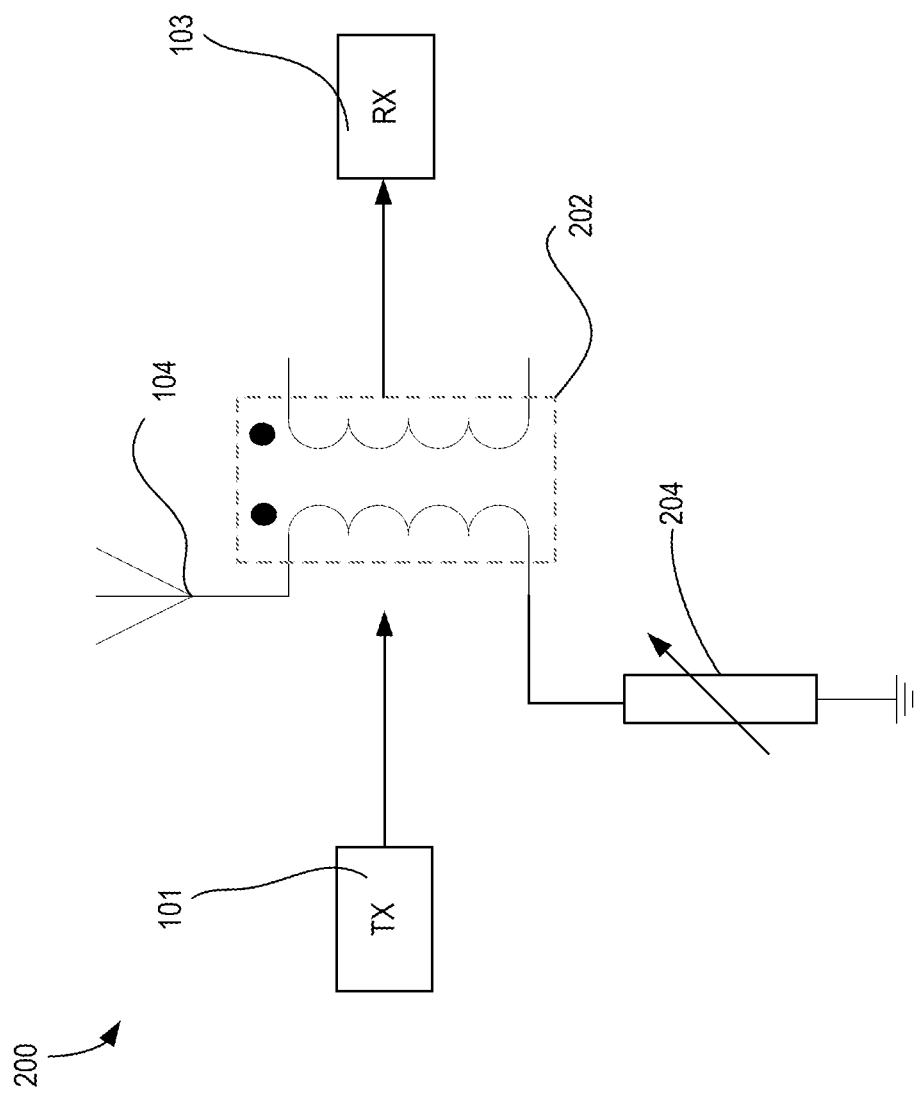
FIG. 2 illustrates a communication apparatus with an electrical-balance duplexer approach for shared antenna between a TX and a RX.

FIG. 2 illustrates a communication apparatus 200 with an electrical-balance duplexer approach for shared antenna between a TX and an RX. Apparatus 200 comprises TX 101, RX 103, an electrical-balanced duplexer 202, antenna 104, and variable impedance 204. Electrical balance duplexers attenuate the TX signal at the RX input by creating a 3-port network. However, typical electrical balance duplexer structures lead to significant losses between TX 101 and the shared antenna port as well as between the shared antenna port and RX 103.

Figure 3:
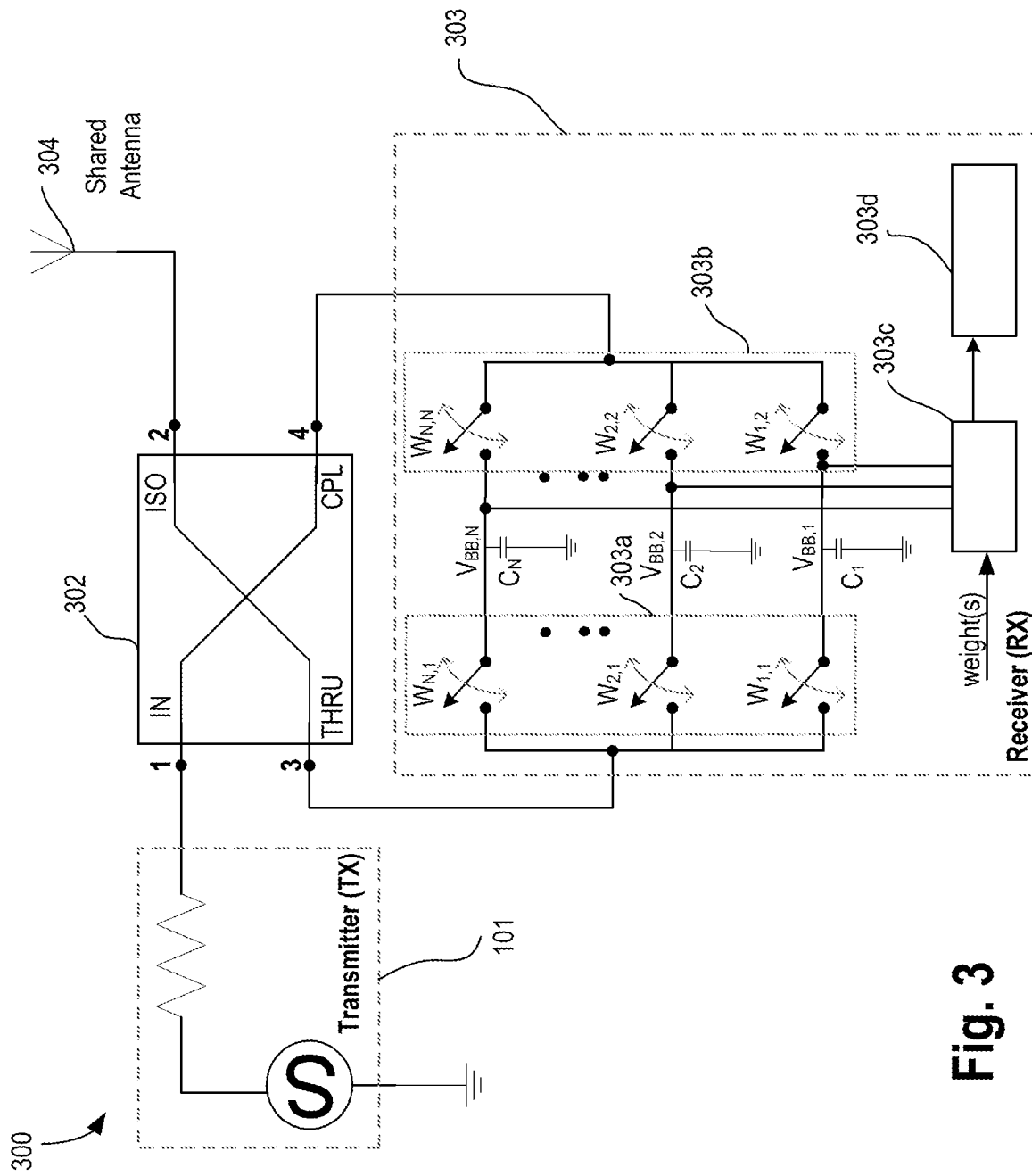
FIG. 3 illustrates a communication apparatus with a shared antenna and non-reciprocal interface using quadrature coupler and switches driven by time-varying control signals, in accordance with some embodiments.

FIG. 3 illustrates a communication apparatus 300 with a shared antenna and non-reciprocal interface using quadrature coupler and switches driven by time-varying control signals, in accordance with some embodiments. Here, a simplified version of TX 101 is shown having a signal source and termination resistance. However, a person skilled in the art would appreciate that TX 101 has many components (active and/or passive) coupled together to provide a signal for transmission. In various embodiments, apparatus 300 comprises a quadrature coupler 302 (e.g., a 3 dB hybrid quadrature coupler) and a switch-capacitor based RX 303 that shares antenna 304 with TX 101.

In some embodiments, quadrature coupler 302 has four ports—input port (IN), isolation port (ISO), through port (THRU) and coupling port (CPL) numbered as 1, 2, 3, and 4, respectively. In some embodiments, the input port (or port 1) is coupled to TX 101 and receives the signal to be transmitted. In some embodiments, shared antenna 304 is coupled to the isolation port (or port 2) and is shared with TX 101 and RX 303. In some embodiments, the through and coupling ports (ports 3 and 4, respectively) are coupled to RX 303. In some embodiments, quadrature coupler 302 splits the input signal received at port 1 into two signals. These two signals may have a goal of equal magnitude but different phases (e.g., 90 degrees part in their respective phases).

In some embodiments, shared antenna 304 is SISO antenna. In some embodiments, shared antenna 304 includes one or more directional or omnidirectional antennas, including monopole antennas, dipole antennas, loop antennas, patch antennas, microstrip antennas, coplanar wave antennas, or other types of antennas suitable for transmission of Radio Frequency (RF) signals. In some multiple-input multiple-output (MIMO) embodiments, as discussed with reference to FIG. 7, antenna(s) 304 are separated to take advantage of spatial diversity.

Referring back to FIG. 3, in some embodiments, RX 303 is a switched capacitor based RX that comprises two or more banks of switches (e.g., switch banks 303a and 303b) coupled to ports 3 and 4, and also coupled to capacitive devices. In some embodiments, the switches are implemented as transistors with their gate terminals coupled to control nodes, wherein the control node provides the time-varying signals for controlling the switches. In some embodiments, the switches are driven by time-varying control signals, $W_{\{i,j\}}$ which are applied to the through and coupled ports, where 'i' and 'j' are integers from 1 to 'N'. In some embodiments, the control signals applied to the switches are such that a certain impedance is presented at the THRU and CPL ports for signals that have a certain phase difference and/or frequency and/or code-domain modulation at the THRU and CPL ports.

For example, without loss of generality, the control signals can be configured such that the THRU and CPL ports present a short impedance for the TX signals at the THRU and CPL ports. Since the input signal from antenna 304 has a different phase progression, the control signals can ensure no loss between the antenna 304 and the RX ports (e.g., ports 3 and 4). In some embodiments, the control signals $W_{\{i,j\}}$ are generated by an on-die finite state machine (FSM), not shown. In some embodiments, the control signals $W_{\{i,j\}}$ are provided by an off-die chip.

In some embodiments, the two switch banks 303a and 303b are coupled together at storage nodes $V_{BB,1}$ through $V_{BB,N}$. These storage nodes hold charge on capacitors $C_1$ through $C_N$ as shown. In some embodiments, the capacitors are implemented as transistors configured in capacitive mode. In some embodiments, the capacitors are implemented as metal capacitors. In some embodiments, the capacitors are discrete capacitors. In some embodiments, the capacitors are hybrid capacitors comprising transistors and metal capacitors. The capacitors may be positioned on package (e.g., off-die), off-package (e.g., off-die), or on-die. In some embodiments, the voltages on the storage nodes $V_{BB,1}$ through $V_{BB,N}$ are added together by summer 303c. In some embodiments, programmable or predetermined weights (e.g., values) are multiplied with the voltages before the voltages are added. The output of the sum of the voltages (that may be multiplied with various values of weights) are then provided to an analog to digital converter (ADC) 303d to generate a corresponding digital representative for further processing.

ADCs are apparatuses that convert continuous physical quantities (e.g., voltages) to digital numbers that represent the amplitude of the physical quantities. In some embodiments, ADC 303d converts the analog output from summer 303c to its corresponding digital representation. Any suitable ADC may be used to implement ADC 303d. For example, ADC 303d is one of: direct-conversion ADC (for flash ADC), two-step flash ADC, successive-approximation ADC (SAR ADC), ramp-compare ADC, Wilkinson ADC, integrating ADC, delta-encoded ADC or counter-ramp, pipeline ADC (also called subranging quantizer), sigma-delta ADC (also known as a delta-sigma ADC), time-interleaved ADC, ADC with intermediate FM stage, or time-stretch ADC.

In some embodiments, the attenuation of the TX signal at the RX input in quadrature coupler 302 based structure is controlled by the signals driving the switches. Without loss of generality, for example, a periodic control signal can be used to attenuate the TX signal at a certain frequency. Alternatively, a code-modulated control signal can be used to attenuate TX signals modulated with a certain code at the RX input. This can be useful in radar systems using code-modulated signals and in communication systems based on well-known code-division multiple access schemes.

In some embodiments, quadrature coupler 302 can be integrated on integrated circuits (ICs) along with the switches. In some embodiments, a hybrid integration approach can be used where the quadrature coupler 302 and switches of RX 303 are integrated in different technologies. In some embodiments, integration in wafer-scale process technologies and placing switching transistors in close proximity to the coupler leads to dramatic size reductions in overall circulator area and significant improvement in power handling. In some embodiment, coupler 302 comprises tunable components that are configured to achieve desired frequency of operation or matching to variable antenna impedance. The relative control signals applied to the switch bank 303a and switch bank 303b can be selected to also provide better rejection of TX signals in the presence of mismatch between the antenna and the coupler impedances.

Figure 4:
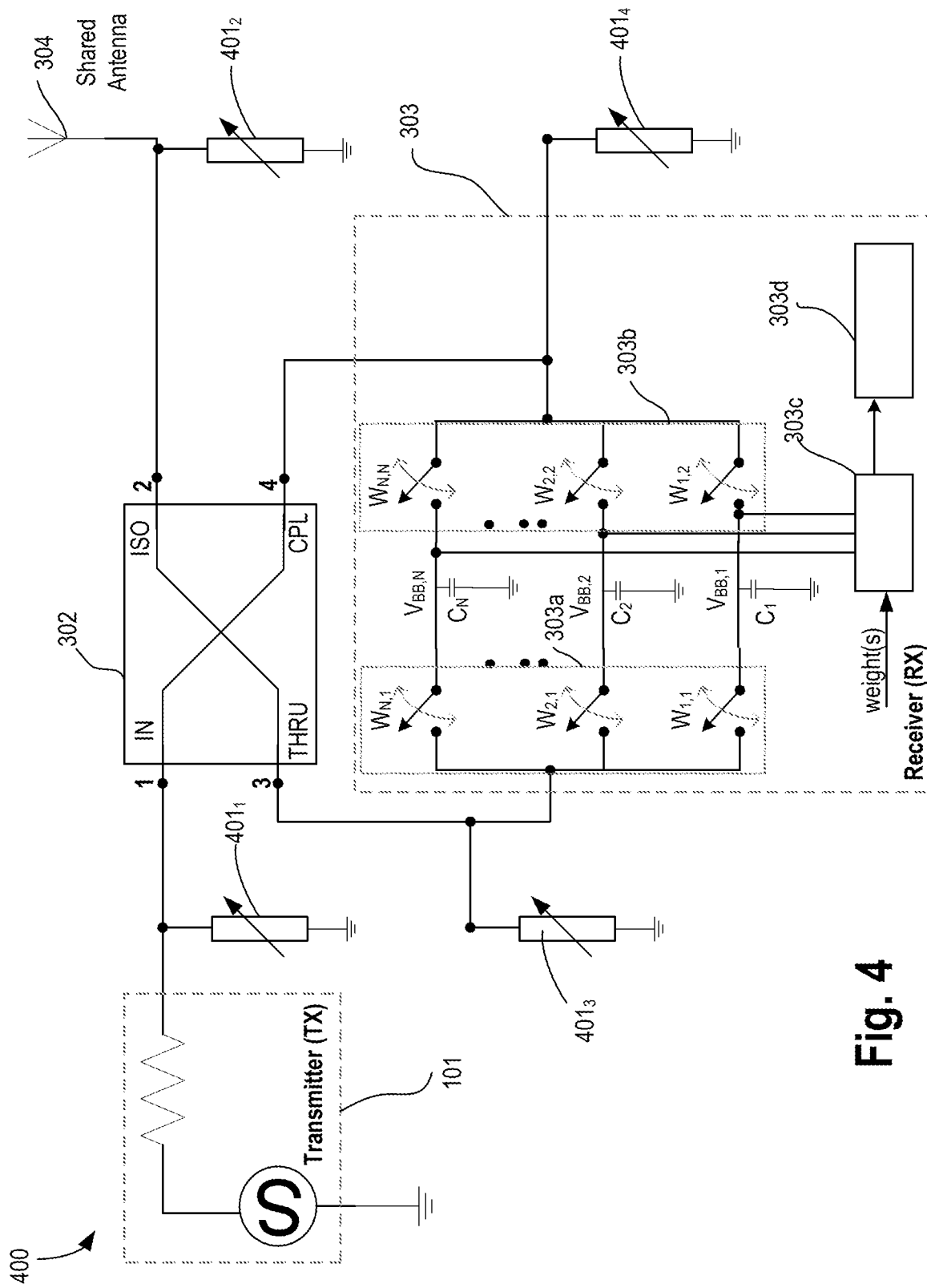
FIG. 4 illustrates a communication apparatus with variable impedances incorporated into the apparatus of FIG. 3, in accordance with some embodiments.

FIG. 4 illustrates apparatus 400 with variable impedances incorporated into the apparatus of FIG. 3, in accordance with some embodiments. In some embodiments, variable impedances (for example, using switchable capacitor banks) can be used to provide higher TX signal rejection by reducing the reflections at the shared antenna port. For example, variable impedances $401_{1-4}$ are provided which are coupled to ports 1 through 4, respectively. In some embodiments, the impedances $401_{1-4}$ can be changed independent of one another. For example, a FSM (not shown) can be used to adjust impedances $401_{1-4}$ for changing environments (e.g., temperature, frequency, voltage, etc.).

Figure 5:
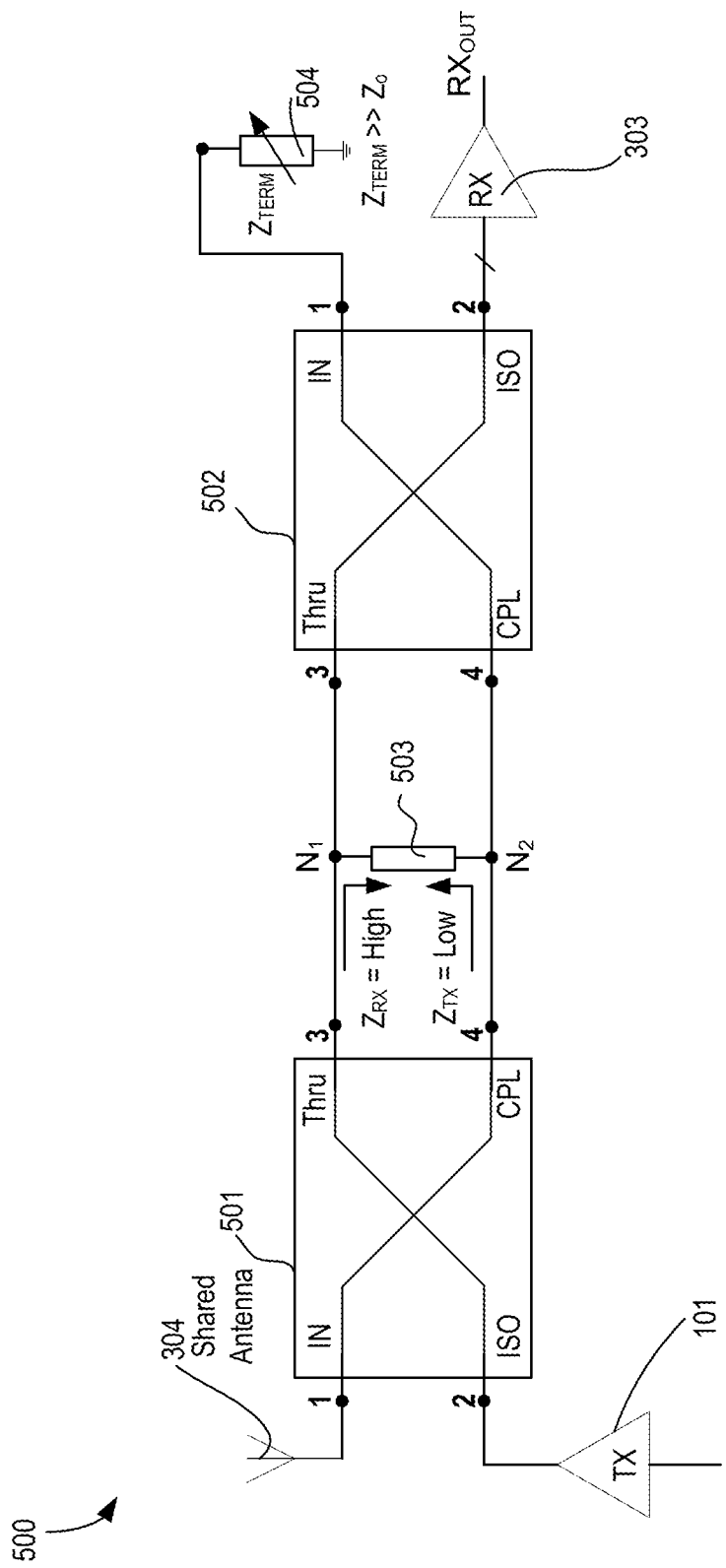
FIG. 5 illustrates a communication apparatus with dual cascaded quadrature couplers, switches driven by time-varying control signals, and a shared antenna coupled together for simultaneous transmit and receive operations, in accordance with some embodiments.

FIG. 5 illustrates a communication apparatus 500 with dual cascaded quadrature couplers and a shared antenna coupled together for simultaneous transmit and receive operations, in accordance with some embodiments. In this example, two quadrature couplers 501 and 502 are coupled together such that the through ports (e.g., ports 3) and the coupling ports (e.g., ports 4) of the two quadrature couplers 501 and 502 are coupled together. In some embodiments, a shunt impedance network 503 is coupled to ports 3 (node $N_1$) and ports 4 (node $N_2$). In some embodiments, the shunt impedance network 503 may be comprised of distributed transmission lines or lumped equivalent using inductor and capacitor connected to switches driven by time-varying signals. In some embodiments, these time-varying signals may be a non-overlapping pulse at a certain frequency or a sequence targeted at selecting/rejecting specific signals. One embodiment of the shunt impedance network 503 is illustrated with reference to FIG. 6.

Referring back to FIG. 5, in some embodiments, TX is coupled to the isolation port (port 2) of the quadrature coupler 501 while the shared antenna 304 is coupled to the input port (port 1) of the quadrature coupler 501. In some embodiments, RX 303 is coupled to the isolation port (port 2) of the quadrature coupler 502 while a termination impedance 504 is coupled to the input port (port 1) of the quadrature coupler 502. In some embodiments, the impedance of the termination impedance 504 has an impedance $Z_{TERM}$ much greater than the characteristic impedance $Z_0$ of quadrature coupler 502. In some embodiments, termination impedance 504 has an impedance which is matched to the impedance of shared antenna 304.

Figure 6:
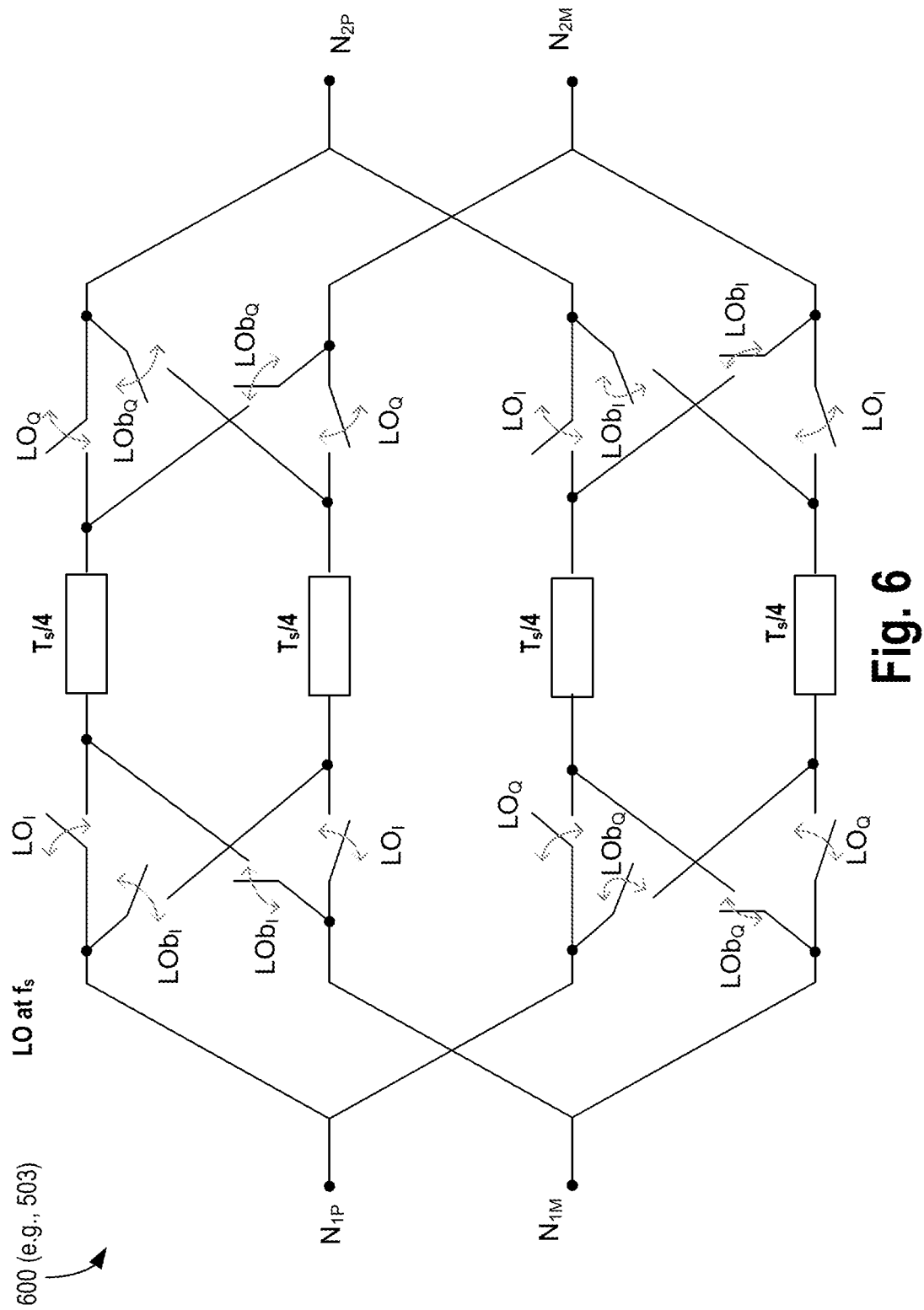
FIG. 6 illustrates a shunt structure for use between the dual cascaded quadrature couplers of FIG. 5, in accordance with some embodiments.

The embodiments of FIG. 5 and FIG. 6 may increase the operating frequency range of the antenna interface and also enable the interface to function with higher signal power from the transmitter.

FIG. 6 illustrates a shunt structure 600 (e.g., 503) for use between the dual cascaded quadrature couplers of FIG. 5, in accordance with some embodiments. In some embodiments, shunt structure 600 comprises switches controlled by a signal having local oscillator (LO) frequency fs. Here, LOb is an inverse of LO while the length of the transmission line and its impedance may be optimized for transmitter signal rejection or desired signal reception. While the shunt structure 503 of FIG. 5 is illustrated as a single-ended shunt structure, it can be implemented as a differential shunt structure with terminals $N_{1P}$, $N_{1M}$, and $N_{2P}$ and $N_{2M}$ as illustrated in FIG. 6. This structure, creates a non-reciprocal network between the THRU and coupled ports of the quadrature coupler. This enables the network to reject the transmitter signal at the receiver output, enabling the system to operate with transmit and receive at the same or nearby frequencies.

Figure 7:
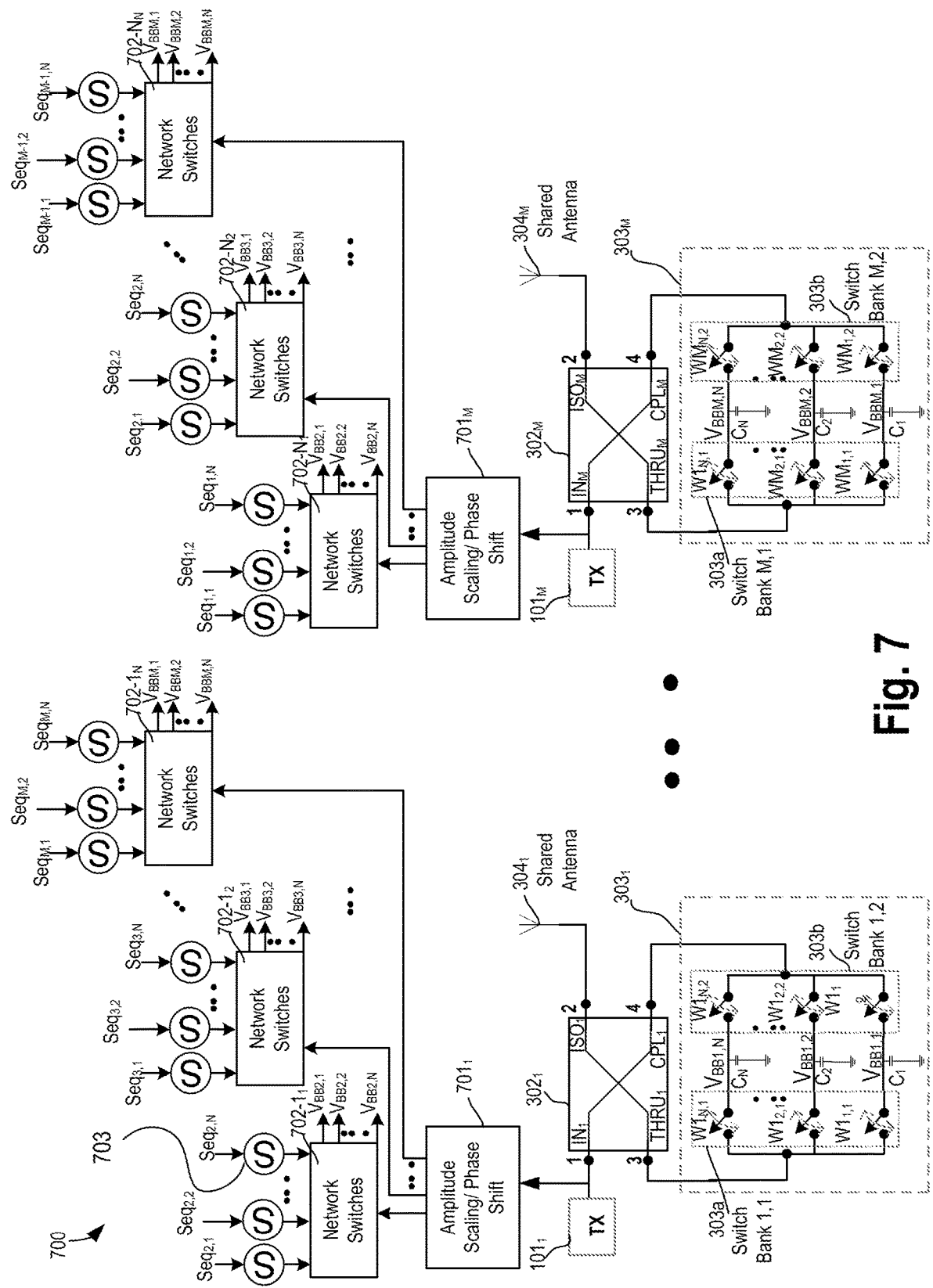
FIG. 7 illustrates a multiple-input-multiple-output (MIMO) configuration of the apparatus of FIG. 3, in accordance with some embodiments of the disclosure.

FIG. 7 illustrates a MIMO configuration 700 of the apparatus of FIG. 3, in accordance with some embodiments of the disclosure. In some embodiments, configuration 700 comprises 'M' number of transmitters ($101_{1-M}$), quadrature couplers ($302_{1-M}$), receivers ($303_{1-M}$), shared antennas ($304_{1-M}$), and passive network for amplitude scaling circuitry ($701_{1-M}$). In some embodiments, 'N' number of network switches are coupled to each passive network for amplitude scaling circuitry. For example, network switches 702-$1_{1-N}$ are coupled to passive network for amplitude scaling circuitry $701_1$, and network switches 702-$N_{1-N}$ are coupled to passive network for amplitude scaling circuitry $701_M$. Each network switch receives 'N' number of signals with different amplitude and frequencies, and are used to generate 'N' number of voltages which can then be used to add to or subtract from the voltages VBB at the capacitive nodes to adjust the received signal amplitude. This enables a multiple-input-multiple-output shared antenna interface where the transmitter signals (e.g., signals form TX $101_{1-M}$) may or may not be independent of each other. The interface reduces the amplitude of the leakage signals from all transmitters TX $101_{1-M}$ on any of the receivers $303_{1-M}$ and enables reception of desired signals at the multiple receivers that are at the same frequency as the transmitter. In some embodiments, the additional active or passive network (e.g., 701, 702, etc.) provides an additional path between the MIMO transmitters TX $101_{1-M}$ and receivers $303_{1-M}$ enabling additional TX self-interference cancellation at the RX beyond that provided by the quadrature coupler/switch network alone.

FIG. 8 illustrates a flowchart 800 of a method for operating the apparatus for simultaneous transmit and receive using any one of the apparatuses of FIGS. 3-7, in accordance with some embodiments of the disclosure. While various blocks shown here are arranged in a particular order, the order is not fixed. For example, some blocks may be executed before others while some may be executed in parallel to other blocks.

At block 801, a first signal is sent by TX 101 to a first port (e.g., input port) of a quadrature coupler 302. At block 802, the first signal is transmitted out (to one or more devices) via one or more antennas 304 coupled to a second port (e.g., isolation port) of the quadrature coupler 302. At block 803, a second signal is received from the second port of the quadrature coupler, wherein the first signal is transmitted and the second signal is received substantially simultaneously. At block 804, the second signal is set to a RX 303 via third port (e.g., through port) and fourth port (coupling port) of the quadrature coupler. At block 805, the switches of the receiver are controlled (e.g., turned on/off) by control signals $W_{i,j}$ to recover the second signal.

Elements of embodiments (e.g., flowchart 800 and scheme described with reference to FIGS. 3-7) are also provided as a machine-readable medium (e.g., memory) for storing the computer-executable instructions (e.g., instructions to implement any other processes discussed herein). The machine-readable medium (e.g., memory) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

The following examples are provided with reference to various embodiments.

Example 1

An apparatus comprising: a transmitter; an antenna; a receiver including switches controllable by time varying signals; and a quadrature coupler including first, second, third, and fourth ports, wherein the first port is coupled to the transmitter, wherein the second port is coupled to the antenna, and wherein the third and fourth ports are coupled to the receiver.

Example 2

The apparatus of example 1 comprises a finite state machine to generate the time varying signals for controlling the switches.

Example 3

The apparatus of example 2, wherein at least one of the time varying signals is one of: a periodic signal; or a code-modulated signal.

Example 4

The apparatus of example 1, wherein the first port is an input port, wherein the second port is an isolation port, wherein the third port is a through port, and wherein the fourth port is a coupling port.

Example 5

The apparatus of example 1, wherein the switches of the receiver are organized into first and second banks, wherein the first bank is coupled to the third port, and wherein the second bank is coupled to the fourth port, and wherein the receiver comprises capacitive devices coupled to the first and second banks.

Example 6

The apparatus of example 1 comprises: a first impedance coupled to the first port; a second impedance coupled to the second port; a third impedance coupled to the third port; and a forth impedance coupled to the forth port.

Example 7

The apparatus of example 6, wherein the first, second, third, and fourth impedances are variable impedances.

Example 8

The apparatus of example 1, wherein the quadrature coupler and the switches of the receiver are integrated in different technologies.

Example 9

The apparatus of example 1, wherein the transmitter and receiver are fabricated on a single integrated circuit (IC) chip, and wherein the quadrature coupler and the antenna are off-chip and coupled to the IC chip.

Example 10

The apparatus of example 1, wherein the antenna is part of the multiple-input-multiple-output (MIMO) antenna array.

Example 11

The apparatus of example 1, wherein the antenna is part of the single-input-single-output (SISO) antenna.

Example 12

An apparatus comprising: a first quadrature coupler having first, second, third, and fourth ports; a second quadrature coupler having first, second, third, and fourth ports, wherein the first quadrature coupler is coupled to the second quadrature coupler such that the second port of the first quadrature coupler is coupled to the second port of the second quadrature coupler, and the third port of the first quadrature coupler is coupled to the third port of the second quadrature coupler; an antenna coupled to the first port of the first quadrature; a transmitter coupled to the third port of the first quadrature; a receiver coupled to the fourth port of the second quadrature coupler; and a termination impedance coupled to the first port of the second quadrature coupler.

Example 13

The apparatus of example 12, comprises a shunt structure coupled to the second and third ports of the first and second quadrature couplers.

Example 14

The apparatus of example 12, wherein for the first and second quadrature couplers, respectively: the first port is an input port; the second port is a through port; the third port is a coupling port; and the fourth port is an isolation port.

Example 15

The apparatus of example 12, wherein the receiver comprises: switches which are controllable by time varying signals; and capacitive devices coupled to the switches.

Example 16

An apparatus comprising: a multiple-input-multiple-output (MIMO) antenna array; a plurality of quadrature couplers coupled to the MIMO array; a plurality of receivers coupled to the plurality of quadrature couplers, wherein an individual one of the receivers of the plurality of receivers comprise: switches which are controllable by time varying signals; and capacitive devices coupled to the switches; and a plurality of transmitters coupled to the plurality of quadrature couplers.

Example 17

The apparatus of example 16, wherein an individual one of the quadrature coupler from among the plurality of quadrature couplers comprises: first, second, third, and fourth ports, wherein the first port is coupled to an individual transmitter of the plurality of transmitters, wherein the second port is coupled to the MIMO antenna array, and wherein the third and fourth ports are coupled to an individual receiver of the plurality of receivers.

Example 18

The apparatus of example 17, comprises: a first impedance coupled to the first port; a second impedance coupled to the second port; a third impedance coupled to the third port; and a forth impedance coupled to the forth port.

Example 19

The apparatus of example 16, wherein the plurality of quadrature couplers and the switches of the individual receiver are integrated in different technologies.

Example 20

The apparatus of example 16, wherein plurality of transmitters and receivers are fabricated on a single integrated circuit (IC) chip, and wherein the quadrature coupler and the MIMO antenna array are off-chip and coupled to the IC chip.

Example 21

A method for reducing signal interference, the method comprising: sending a first signal to a first port of a quadrature coupler; transmitting the first signal via one or more antennas coupled to a second port of the quadrature coupler; receiving a second signal from the second port of the quadrature coupler; and sending the second signal to a receiver via third and fourth ports of the quadrature coupler; and controlling switches of the receiver to recover the second signal.

Example 22

The method of example 21, wherein first and second signals are sent simultaneously to the first and second ports, respectively.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

We claim:

1. An apparatus comprising:
   a transmitter;
   an antenna;
   a receiver including switches controllable by time varying signals; and
   a quadrature coupler including first, second, third, and fourth ports, wherein:
      the first port is coupled to the transmitter,
      the second port is coupled to the antenna,
      the third and fourth ports are coupled to the receiver,
      the switches of the receiver are organized into first and second banks,
      the first bank is coupled to the third port,
      the second bank is coupled to the fourth port,
      the receiver comprises capacitive devices coupled to the first and second banks,
         a first terminal of an individual capacitor, of the capacitive devices, is connected to a switch of the first bank and to a switch of the second bank of switches, and
         a second terminal of the individual capacitor is connected to a reference node.

2. The apparatus of claim 1 comprises a finite state machine to generate the time varying signals for controlling the switches.

3. The apparatus of claim 2, wherein at least one of the time varying signals is one of:
   a periodic signal; or
   a code-modulated signal.

4. The apparatus of claim 1, wherein the first port is an input port, wherein the second port is an isolation port, wherein the third port is a through port, and wherein the fourth port is a coupling port.

5. The apparatus of claim 1 comprises:
   a first impedance coupled to the first port;
   a second impedance coupled to the second port;
   a third impedance coupled to the third port; and
   a forth impedance coupled to the forth port.

6. The apparatus of claim 5, wherein the first impedance, the second impedance, the third impedance, and the fourth impedance are variable impedances.

7. The apparatus of claim 1, wherein the quadrature coupler and the switches of the receiver are integrated in different technologies.

8. The apparatus of claim 1, wherein the transmitter and the receiver are fabricated on a single integrated circuit (IC) chip, and wherein the quadrature coupler and the antenna are off-chip and coupled to the IC chip.

9. The apparatus of claim 1, wherein the antenna is part of a multiple-input-multiple-output (MIMO) antenna array.

10. The apparatus of claim 1, wherein the antenna is part of a single-input-single-output (SISO) antenna.

11. An apparatus comprising:
    a first quadrature coupler having first, second, third, and fourth ports;
    a second quadrature coupler having first, second, third, and fourth ports, wherein the first quadrature coupler is connected in series to the second quadrature coupler such that the second port of the first quadrature coupler is coupled to the second port of the second quadrature coupler, and wherein the third port of the first quadrature coupler is coupled to the third port of the second quadrature coupler;
    an antenna coupled to the first port of the first quadrature;
    a transmitter coupled to the third port of the first quadrature;

a receiver coupled to the fourth port of the second quadrature coupler; and a termination impedance coupled to the first port of the second quadrature coupler.

12. The apparatus of claim 11, comprises a shunt structure coupled to the second and third ports of the first and second quadrature couplers.

13. The apparatus of claim 11, wherein for the first and second quadrature couplers, respectively:
the first port is an input port;
the second port is a through port;
the third port is a coupling port; and
the fourth port is an isolation port.

14. The apparatus of claim 11, wherein the receiver comprises:
switches which are controllable by time varying signals; and
capacitive devices coupled to the switches.

15. An apparatus comprising:
a multiple-input-multiple-output (MIMO) antenna array;
a plurality of quadrature couplers coupled to the MIMO antenna array;
a plurality of receivers coupled to the plurality of quadrature couplers, wherein an individual one of the receivers of the plurality of receivers comprise:
a first set of switches which are controllable by corresponding time varying signals, wherein the first set of switches are coupled to an individual quadrature coupler of the plurality of quadrature couplers;
a second set of switches which are controllable by corresponding time varying signals, wherein the second set of switches are coupled to the individual quadrature coupler; and
capacitors coupled to the first and second sets of switches, wherein a first terminal of an individual capacitor is connected to a switch of the first set of switches and to a switch of the second set of switches, and wherein a second terminal of the individual capacitor is connected to a reference node; and
a plurality of transmitters coupled to the plurality of quadrature couplers.

16. The apparatus of claim 15, wherein an individual one of the quadrature coupler from among the plurality of quadrature couplers comprises:
first, second, third, and fourth ports, wherein the first port is coupled to an individual transmitter of the plurality of transmitters, wherein the second port is coupled to the MIMO antenna array, and wherein the third and fourth ports are coupled to an individual receiver of the plurality of receivers.

17. The apparatus of claim 16, comprises:
a first impedance coupled to the first port;
a second impedance coupled to the second port;
a third impedance coupled to the third port; and
a forth impedance coupled to the forth port.

18. The apparatus of claim 15, wherein the plurality of quadrature couplers and the switches of the individual receiver are integrated in different technologies.

19. The apparatus of claim 15, wherein the plurality of transmitters and receivers are fabricated on a single integrated circuit (IC) chip, and wherein the quadrature coupler and the MIMO antenna array are off-chip and coupled to the IC chip.

20. A method for reducing signal interference, the method comprising:
sending a first signal to a first port of a quadrature coupler;
transmitting the first signal via one or more antennas coupled to a second port of the quadrature coupler;
receiving a second signal from the second port of the quadrature coupler;
sending the second signal to a receiver via third and fourth ports of the quadrature coupler; and
controlling switches of the receiver to recover the second signal, wherein the switches include:
a first switch coupled to the third port; and
a second switch coupled to the fourth port,
wherein the receiver includes a capacitor having a first terminal coupled to the first and second switches, and a second terminal coupled to a reference node.

21. The method of claim 20, wherein first and second signals are sent simultaneously to the first and second ports, respectively.

* * * * *

UNITED STATES PATENT AND TRADEMARK OFFICE
CERTIFICATE OF CORRECTION

PATENT NO. : 10,797,760 B2
APPLICATION NO. : 15/956660
DATED : October 6, 2020
INVENTOR(S) : Arun Natarajan et al.

Page 1 of 1

It is certified that error appears in the above-identified patent and that said Letters Patent is hereby corrected as shown below:

In the Specification

Column 1, Lines 16-19:
The embodiments of the invention were made with the support of the United States Government under Award No. 1554720-ECCS awarded by the National Science Foundation. The Government has certain rights in the invention.
Should read:
This invention was made with Government support under 1554720-ECCS awarded by the National Science Foundation and under N66001-17-1-4050 awarded by US Department of Defense/Defense Advanced Research Projects Agency. The Government has certain rights in the invention.

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*